United States Patent
Choi et al.

(10) Patent No.: US 11,752,507 B2
(45) Date of Patent: Sep. 12, 2023

(54) ELECTROSTATIC PRECIPITATOR WITH ELECTROMAGNETIC WAVE TUBE INCLUDING CARBON NANOTUBE-BASED EMITTER AND METHOD FOR REMOVING MICROPARTICLES IN CONTAMINATED AIR USING ELECTROSTATIC PRECIPITATOR

(71) Applicant: AweXome Ray, Inc., Anyang-si (KR)

(72) Inventors: Hong Sue Choi, Anyang-si (KR); Jun Young Choi, Anyang-si (KR); Se Hoon Gihm, Anyang-si (KR)

(73) Assignee: AweXome Ray, Inc., Anyang-si (KR)

( * ) Notice: Subject to any disclaimer, the term of this patent is extended or adjusted under 35 U.S.C. 154(b) by 245 days.

(21) Appl. No.: 17/097,852

(22) Filed: Nov. 13, 2020

(65) Prior Publication Data

US 2021/0370317 A1    Dec. 2, 2021

(30) Foreign Application Priority Data

May 29, 2020    (KR) .................. 10-2020-0065201

(51) Int. Cl.
  *B03C 3/41*    (2006.01)
  *B03C 3/68*    (2006.01)
  *B03C 3/06*    (2006.01)

(52) U.S. Cl.
  CPC .................. *B03C 3/41* (2013.01); *B03C 3/06* (2013.01); *B03C 3/68* (2013.01); *B03C 2201/08* (2013.01)

(58) Field of Classification Search
  CPC combination set(s) only.
  See application file for complete search history.

(56) References Cited

U.S. PATENT DOCUMENTS 7,402,194 B2 *    7/2008    Furukawa .................. B03C 3/60
                                                              252/502

FOREIGN PATENT DOCUMENTS

JP           2000-334331 A      12/2000
KR          10-1454442 B1       11/2014
KR      10-2015-0112829 A       10/2015

* cited by examiner

*Primary Examiner* — Christopher P Jones
*Assistant Examiner* — Sonji Turner
(74) *Attorney, Agent, or Firm* — Knobbe, Martens, Olson & Bear, LLP

(57) ABSTRACT

This application relates to an electrostatic precipitator with an electromagnetic wave tube comprising a carbon nanotube (CNT)-based emitter. The electrostatic precipitator includes a charger configured to include the CNT-based emitter and ionize microparticles, in contaminated air introduced from the environment, by emitting an electromagnetic wave. The electrostatic precipitator further includes a collector configured to collect the ionized microparticles to discharge clean air.

10 Claims, 8 Drawing Sheets

ELECTROSTATIC PRECIPITATOR WITH ELECTROMAGNETIC WAVE TUBE INCLUDING CARBON NANOTUBE-BASED EMITTER AND METHOD FOR REMOVING MICROPARTICLES IN CONTAMINATED AIR USING ELECTROSTATIC PRECIPITATOR

CROSS-REFERENCE TO RELATED APPLICATION

This application claims priority to Korean Patent Application No. 10-2020-0065201, filed on May 29, 2020. The entire contents of the application on which the priority is based are incorporated herein by reference.

BACKGROUND

Technical Field

The present disclosure relates to an electrostatic precipitator with an electromagnetic wave tube including a carbon nanotube-based emitter and a method for removing microparticles in contaminated air using the electrostatic precipitator.

Description of Related Technology

Since cement factories, thermal power stations, etc., discharge a large amount of microparticles, each factory or power station purifies the air using a dust collector so as to prevent air contamination due to discharged microparticles.

A dust collector, in particular, an electrostatic precipitator is a device that collects microparticles so that the microparticles generated in factories or power stations can be prevented from being discharged to the outside, and it is generally operated in such a way that the device ionizes the microparticles contained in the gas by electric corona discharge and collects the ionized microparticles with an electrostatic suction force thereby cleaning the gas.

SUMMARY

An object of the present disclosure is to provide an electrostatic precipitator, which is capable of maintaining a charge balance during ionization and adjusting a tube voltage according to a contamination level of contaminated air, by using an electromagnetic wave tube that includes a carbon nanotube-based emitter.

In accordance with an aspect of the present disclosure, there is provided an electrostatic precipitator with an electromagnetic wave tube comprising a carbon nanotube (CNT)-based emitter, the electrostatic precipitator comprising: a charger configured to include the carbon nanotube (CNT)-based emitter and ionize microparticles in contaminated air introduced from outside by emitting an electromagnetic wave; and a collector configured to collect the ionized microparticles to discharge clean air.

Herein, the charger is further configured to adjust the tube voltage of the electromagnetic wave based on the contamination level of the contaminated air.

Herein, when the contamination level is higher than the preset standard, the charger changes the tube voltage of the electromagnetic wave from a first voltage to a second voltage, which is higher than the first voltage, and when the contamination level is lower than the preset standard, the charger changes the tube voltage of the electromagnetic wave from the first voltage to a third voltage, which is lower than the first voltage.

Herein, the charger further comprises a top plate and a bottom plate that form a passage through which air flows; and wherein the electromagnetic wave tube comprising an emitter is attached to at least one of the top plate and the bottom plate to be attachable or detachable.

Herein, the position where the electromagnetic wave tube comprising an emitter is attached is determined based on the ionization efficiency of the microparticles.

Herein, the emitter comprises a plurality of yarns that are formed in a structure extending in a predetermined direction by agglomeration of a plurality of carbon nanotubes.

Herein, the electromagnetic wave has a wavelength of 50 nm or less.

In accordance with another aspect of the present disclosure, there is provided a method for removing microparticles in contaminated air using an electrostatic precipitator with an electromagnetic wave tube comprising a carbon nanotube (CNT)-based emitter, the method comprising: introducing contaminated air from outside; ionizing the microparticles in the contaminated air introduced by emitting an electromagnetic wave; and collecting the ionized microparticles and discharging clean air.

According to an embodiment of the present disclosure, the electrostatic precipitator, by emitting an electromagnetic wave using a carbon nanotube-based emitter, is capable of solving the problem of ozone generation accompanied by corona discharge, achieving a charge balance during ionization of microparticles contained in contaminated air, and adjusting a tube voltage according to a contamination level of contaminated air, thereby increasing collection efficiency and improving power efficiency.

DETAILED DESCRIPTION

In the case of the corona discharge method used in some electrostatic precipitators, the method has problems in that it is difficult to maintain the charge balance between a positive charge and a negative charge, secondary air contamination occurs due to a large amount of ozone generated due to an excess negative charge formed during the corona discharge process, and has a difficulty in operating an electrostatic precipitator due to high power consumption and low dust collection efficiency, and has a drawback in that in that the characteristics of x-rays cannot be changed depending on the dust collection environment. Accordingly, there is a need to propose a more improved electrostatic precipitator so as to improve the conventional problems and increase the collection efficiency.

Advantages and features of the present disclosure, and methods for achieving them will become apparent with reference to embodiments described below in detail in conjunction with the accompanying drawings. However, the present disclosure is not limited to the embodiments disclosed below, but may be implemented in various different embodiments; and the embodiments disclosed herein are provided only to make the disclosure of the present disclosure complete, and only to enable those skilled in the art to fully understand the scope of the present disclosure; and the scope of the present disclosure is defined only by the claims.

In the description of embodiments according to the present disclosure, if it is determined that a detailed description of known functions or configurations may unnecessarily obscure the subject matters of the present disclosure, the detailed descriptions thereof will be omitted. In addition, terms to be described later are those defined in consideration of functions in the embodiments of the present disclosure, and may vary depending on the intention or practice of a user or operator. Therefore, the definition should be made based on the contents throughout this specification.

Figure 1:
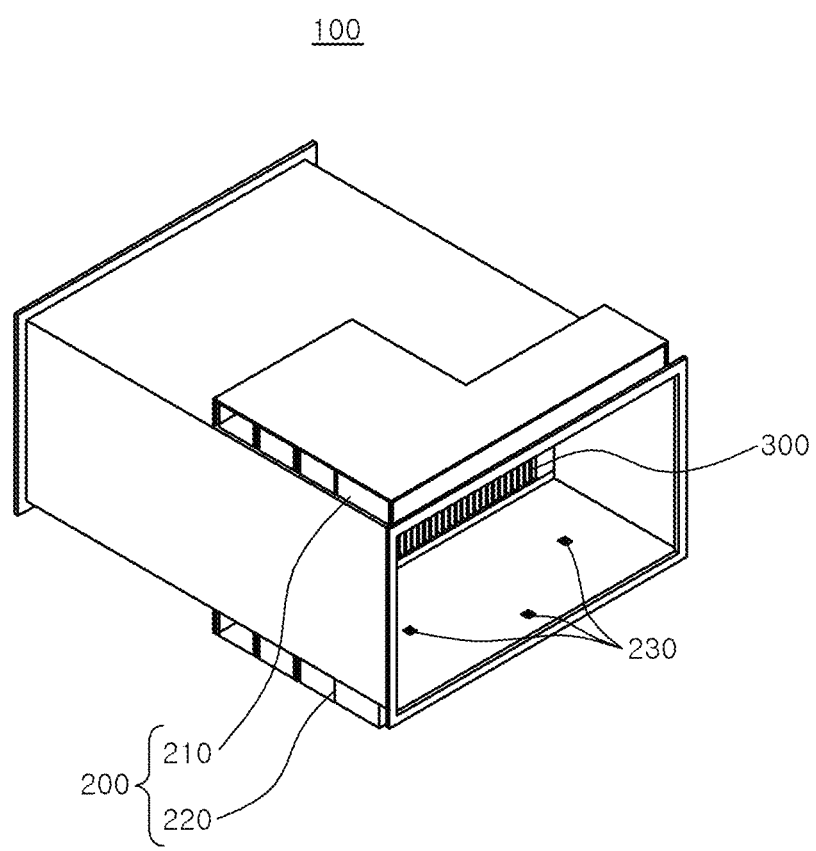
FIG. 1 shows an electrostatic precipitator according to an embodiment of the present disclosure.

FIG. 1 shows an electrostatic precipitator according to an embodiment of the present disclosure.

Referring to FIG. 1, an electrostatic precipitator 100 may include a charger 200 and a collector 300.

An electrostatic precipitator 100 can purify contaminated air introduced from outside by using a charger 200 and a collector 300.

The charger 200 can electrically charge microparticles in contaminated air introduced from the outside. As used herein, microparticles may include not only particles in the form of dust and a particulate matter but also gas molecules (e.g., viruses and total volatile organic compounds (TVOC)). That is, as used herein, microparticles may refer to all of the subjects which are desired to be collected from contaminated air for the purification of contaminated air.

The charger 200 may include an electromagnetic wave tube which is used to ionize microparticles in contaminated air. The electromagnetic wave tube may be coupled with atop plate and/or a bottom plate of the charger 200 through a coupling part 230. The electromagnetic wave tube may include a carbon nanotube (CNT)-based emitter. The electromagnetic wave tube and the emitter included in the electromagnetic wave tube will be described in more detail through FIGS. 2 to 6.

The collector 300 may include a plurality of dust collecting plates. The plurality of dust collecting plates, which are included in the collector 300, are installed so that contaminated air including charged microparticles can pass between the dust collecting plates. An electrostatic force may be generated between the plurality of dust collecting plates, which are included in the collector 300, due to a voltage applied from outside.

As such, when contaminated air including ionized microparticles passes between the dust collecting plates on which electrostatic force is formed, the ionized microparticles are collected on the dust collection plates by an electrostatic force, and accordingly, clean air where microparticles are removed from contaminated air can be discharged to the outside.

Figure 2:
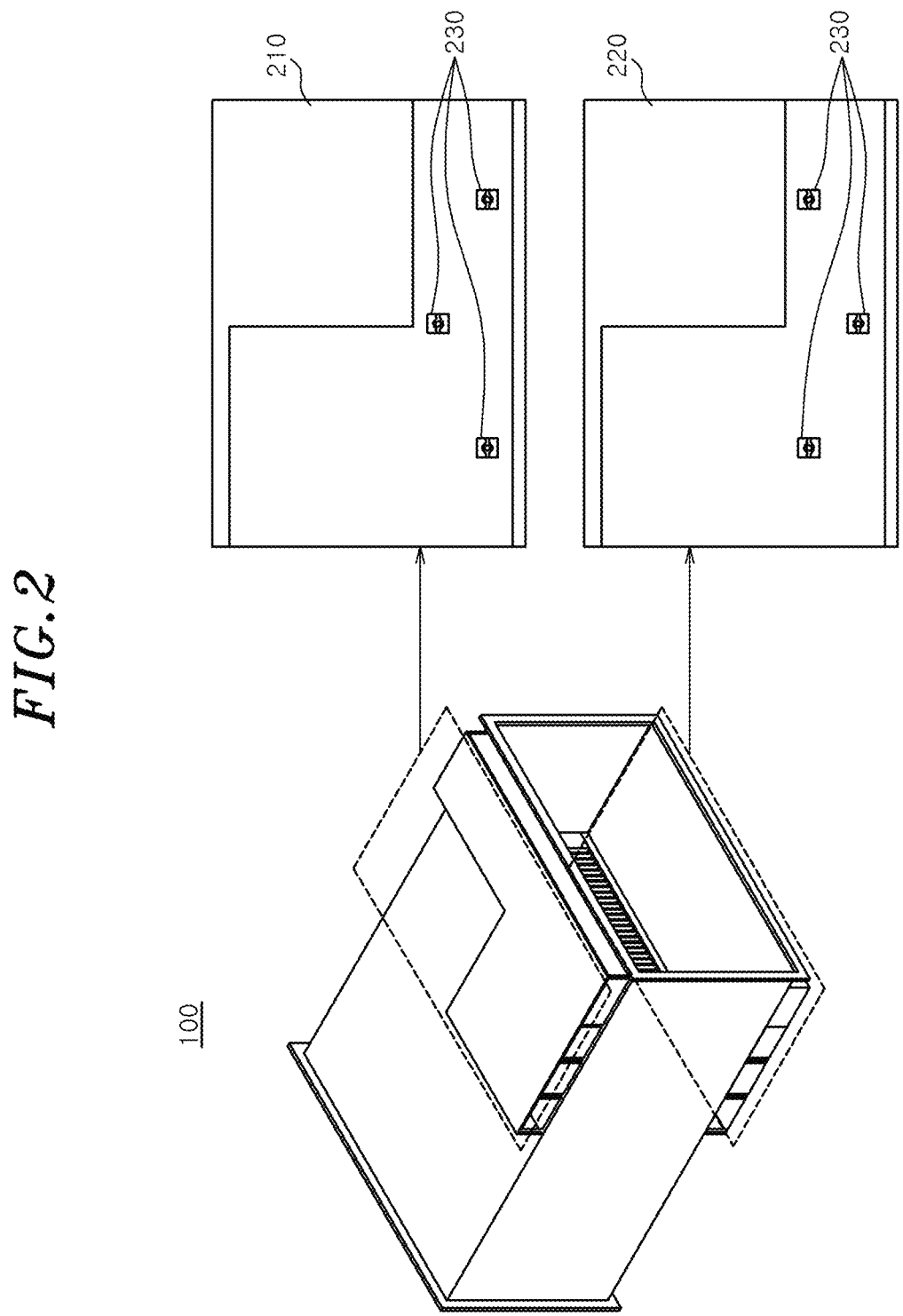
FIG. 2 shows a charger according to an embodiment of the present disclosure.
Figure 3:
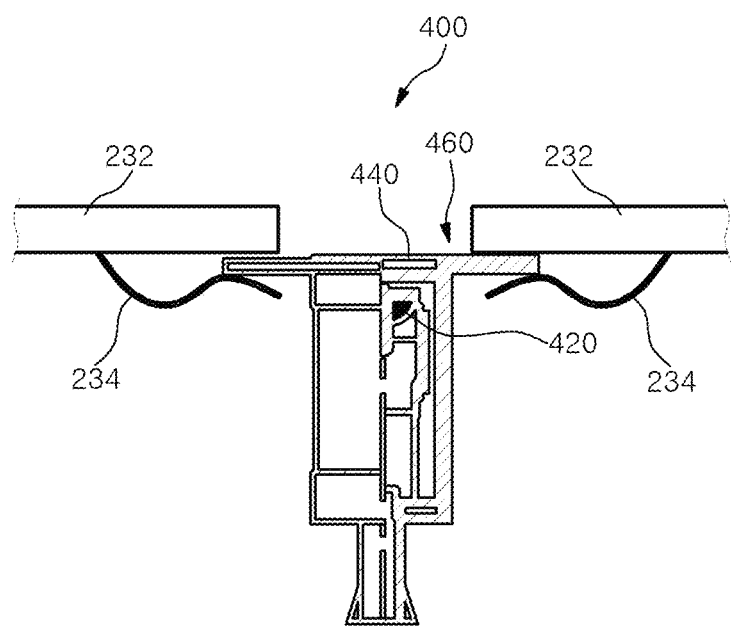
FIG. 3 shows an electromagnetic wave tube according to an embodiment of the present disclosure.

FIG. 2 shows a charger according to an embodiment of the present disclosure and FIG. 3 shows an electromagnetic wave tube according to an embodiment of the present disclosure.

Referring to FIG. 2, the charger 200 may include a top plate 210 and a bottom plate 220. The top plate 210 and the bottom plate 220 may each include one or more coupling parts 230. The coupling parts 230 included in the top plate 210 and the bottom plate 220 may be used to attach/couple/fix an electromagnetic wave tube to the charger 200.

Referring further to FIG. 3, the electromagnetic wave tube 400 included in the charger 200 may include an emitter 420, a target 440, and a flange 460.

The electromagnetic wave tube 400 can irradiate the microparticles in contaminated air with an electromagnetic wave, which was generated by the collision of the electrons, that are emitted from an emitter 420 (e.g., carbon nanotube-based emitter) included in the electromagnetic wave tube 400, with a target 440 at a high speed; and the microparticles exposed to the electromagnetic wave can be ionized.

The electromagnetic wave may include x-rays and extreme ultraviolet (EUV). According to an embodiment, the wavelength of electromagnetic wave may be 50 nm or less, and more specifically, the wavelength of electromagnetic wave may be 0.01 nm or higher and 50 nm or less.

The electromagnetic wave tube 400 can generate an electromagnetic wave, and when the generated electromagnetic wave is radiated and ionizes microparticles, a charge balance can be achieved in the contaminated air during ionization, and accordingly, the filter for post-treatment installed at a rear end of the collector 300 for post-treatment may not be necessary.

The electromagnetic wave tube 400 may be attached to/detached from a coupling part 230, which is included in a top plate 210 and/or a bottom plate 220, using the flange 460.

The coupling part 230 may include at least two pairs of charger cases 232 and brackets 234. The charger cases 232 and brackets 234 may be used to attach/couple/fix the electromagnetic wave tube 400 to the coupling part 230.

For example, by adjusting the position/direction/rotation of the flange 460 in a state where the electromagnetic wave tube 400 is coupled to the coupling part 230, the flange 460 of the electromagnetic wave tube 400 is fixed while being in close contact between the charger cases 232 and the brackets 234, and as the flange 46W is fixed by the charger cases 232 and the brackets 234, the electromagnetic wave tube 400 can be attached/coupled/fixed to the coupling part 230. The position in the electromagnetic wave tube 400, where it is attached to the top plate 210 and/or the bottom plate 220 (i.e., the position in the coupling part 230 where it is coupled to the electromagnetic wave tube 400), can be determined (changed) based on the ionization efficiency of microparticles. The efficiency at which microparticles are ionized can be determined according to the volume to which the electromagnetic wave is irradiated and the distance between microparticles, and accordingly, the electromagnetic wave tube 400 can be attached to the position where an electromagnetic wave is irradiated so as to maximize the efficiency of ionization of microparticles. According to embodiments, the position where the electromagnetic wave tube 400 is attached may be determined by using artificial Intelligence (AI). The position where the electromagnetic wave tube 400 is disposed will be described in more detail in FIG. 7.

The position where the electromagnetic wave tube 400 is attached may be determined during the production of the electrostatic precipitator 100 or may be determined during the use of the electrostatic precipitator 100.

The emitter 420 may correspond to the cathode in the electromagnetic wave tube 400. The emitter 420 can emit electrons using a carbon nanotube sheet consisting of a plurality of carbon nanotubes so as to generate an electromagnetic wave.

The emitter 420 can change a tube voltage, which means the maximum voltage given between the anode and the cathode of the electromagnetic wave tube 400. The emitter 420 can emit electrons by changing (adjusting) the tube voltage according to an embodiment. Accordingly, the quality, dose, etc. of the electromagnetic wave generated in the electromagnetic wave tube 400 can be changed, and thus, the penetration ability, etc. of the electromagnetic wave can be changed.

According to an embodiment, the emitter 420 can change a tube voltage based on a contamination level of contaminated air. For example, when the contamination level of contaminated air is higher than the preset standard, the emitter 420 can emit electrons by a high tube voltage (or by increasing the tube voltage), whereas when the contamination level of contaminated air is lower than the preset standard, the emitter 420 can emit electrons by a low tube voltage (or by decreasing the tube voltage).

In particular, the contamination level may refer to a concentration of microparticles in contaminated air which is collected inside of the electrostatic precipitator 100 (or inside of the charger 200) at a particular time point.

According to an embodiment, the tube voltage may be automatically changed according to a contamination level of the contaminated air or may be changed manually by the user's setting.

The target 440 may correspond to the anode in the electromagnetic wave tube 400. An electromagnetic wave can be generated w % ben the electrons generated by the emitter 420 collide with the target 440.

Figure 4:
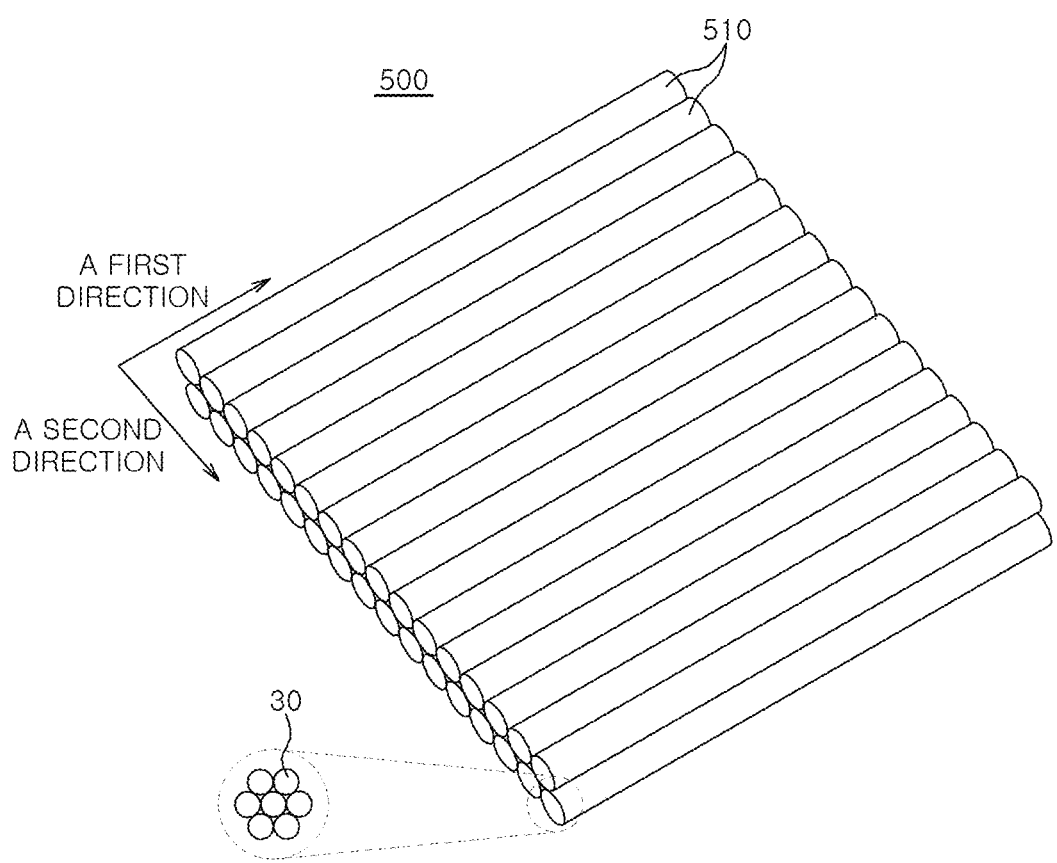
FIG. 4 shows carbon nanotube sheets according to an embodiment of the present disclosure.

FIG. 4 shows carbon nanotube sheets according to an embodiment of the present disclosure.

Referring to FIG. 4, the carbon nanotube sheet 500 may include a plurality of yarns 510, which extend in a first direction perpendicular to a second direction between both ends.

The yarn 510 may include one or more carbon nanotubes 30. The yarn 510 may consist of a single long-grown fiber of the carbon nanotube 30; or consist of a long cylindrical (a solid cylinder where the center portion is filled or a hollow cylinder where the center portion is empty) fiber where sides of a plurality of carbon nanotubes 30 are agglomerated with each other by a π-π interaction.

According to an embodiment, as shown in FIG. 4, the carbon nanotube sheet 500 may be formed in the form such that a plurality of yarns 510, which are arranged side by side in a second direction, overlap two or more in a direction perpendicular to the first and second directions. Alternatively, according to another embodiment, the carbon nanotube sheet 500 may be formed in such a structure that a plurality of yarns 510 are not overlapped but are arranged side by side in the second direction.

Figure 5:
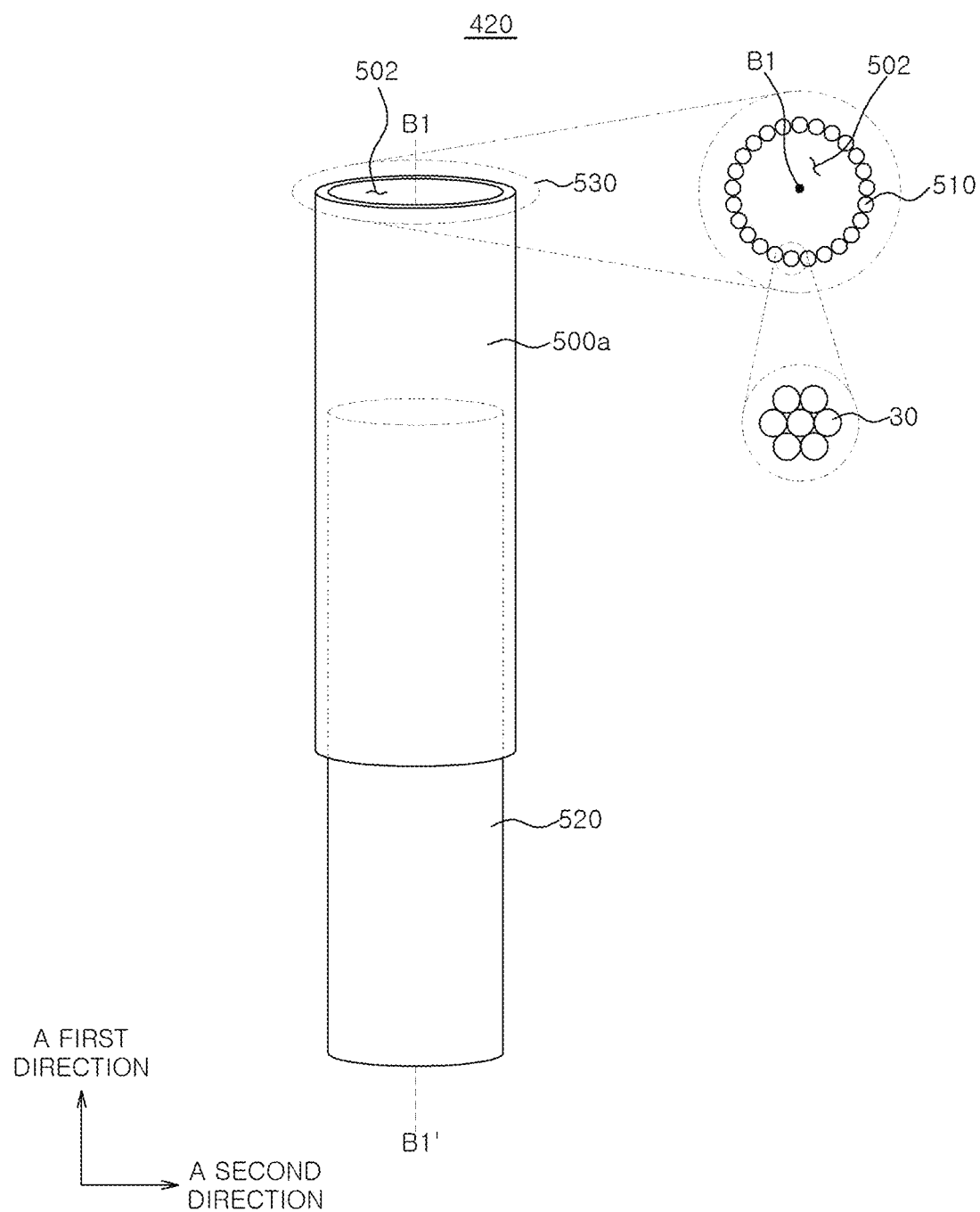
FIG. 5 shows a carbon nanotube-based emitter according to an embodiment of the present disclosure.

FIG. 5 shows a carbon nanotube-based emitter according to an embodiment of the present disclosure.

Referring to FIG. 5, the emitter 420 may include a first tube 500*a*, which includes a yarn 510 that consists of a single carbon nanotube 30 or a plurality of carbon nanotubes 30 where sides are agglomerated with each other by a π-π interaction; and a conductive wire 520.

The first tube 500*a* may be formed in the form of a pipe having a first internal space 502 where the plurality of yarns 510 of the carbon nanotube sheet 500 are wound around an imaginary first axis (B1-B1') parallel to the first direction, and the conductive wire 520 may be formed in the form of a cylinder to be positioned so as to occupy at least part of the first internal space 502. That is, the first tube 500*a* may be formed in such a structure that at least part of the first tube 500*a* is brought into contact with the conductive wire 520 while encompassing at least part of the conductive wire 520.

The emitter 420 can emit electrons through a front end 530 of a region in the first tube 500*a* that does not overlap with the conductive wire 520.

Alternatively, unlike the one shown in FIG. 5, the emitter 420 may consist of only the first tube 500*a* without including the conductive wire 520. In this case, the first tube 500*a* may be the emitter 420 itself, and the emitter 420 can emit electrons through the front ends of the plurality of yarns 510.

The emitter 420 has an advantage in that it is easy to emit electrons intensively within a unit area through the front ends of the carbon nanotubes 30 and yarns 510, and in particular, the emitter 420 in the form of a pipe has an advantage in that it is easy to emit electrons intensively within a unit area from different yarns 510 and the carbon nanotubes 30 consisting of different yarns 510. In addition, the emitter 420 has an advantage in that it is advantageous to maintain its original shape due to its high self-supporting property.

As such, the electrons intensively emitted within a unit area, for example, have an effect of maximizing the total amount of an electromagnetic wave generated in the unit area as the electrons emitted from the emitter 420 reach the target 440. Accordingly, the emitter 420 can solve the problem of miniaturization in manufacturing an electromagnetic wave tube with a high output.

Figure 6:
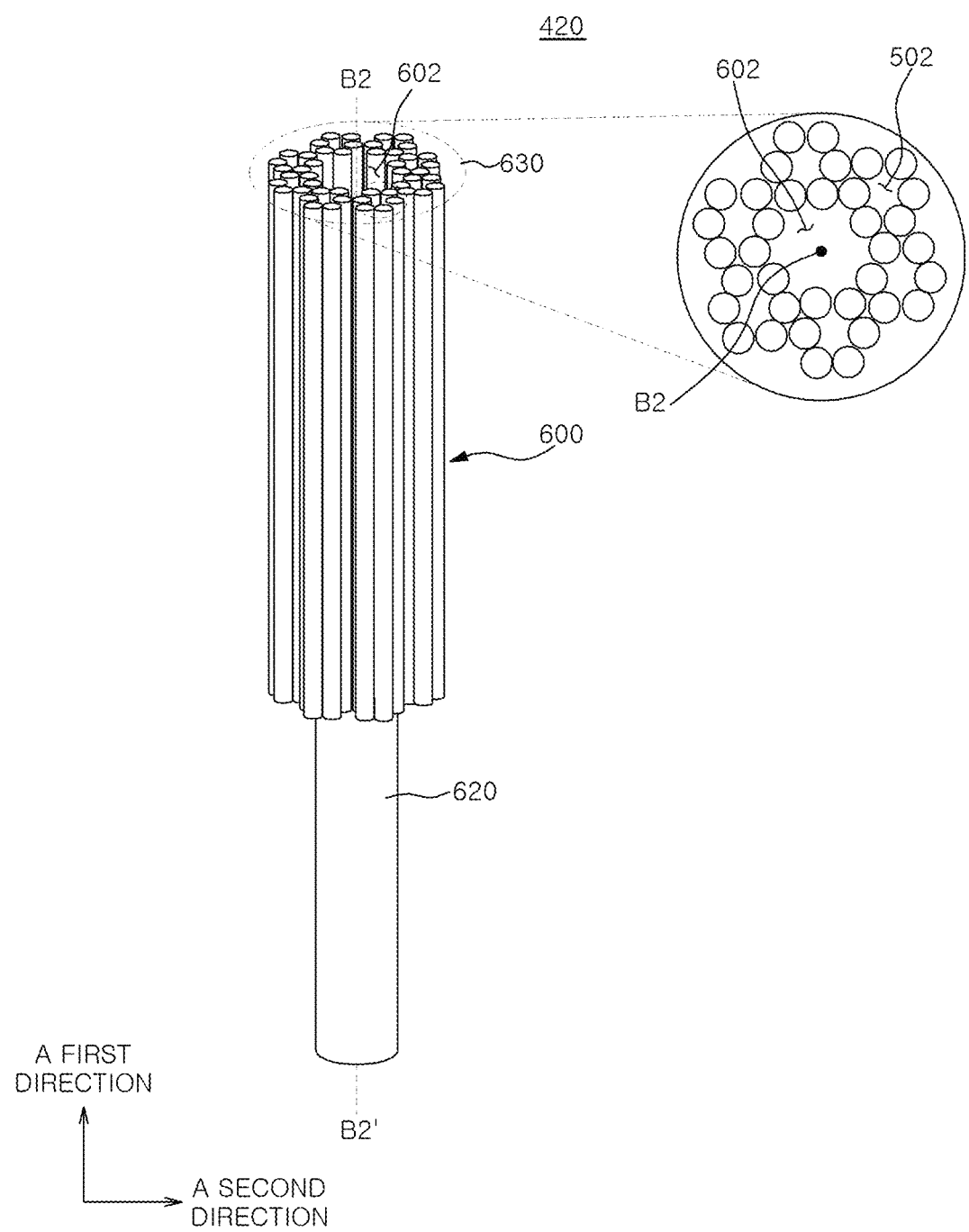
FIG. 6 shows a carbon nanotube-based emitter according to another embodiment of the present disclosure.

FIG. 6 shows a carbon nanotube-based emitter according to another embodiment of the present disclosure.

Referring to FIG. 6, the emitter 420 may include a second tube 60W and a conductive wire 620.

The second tube 600 may be formed in the form of a pipe having a second internal space 602 where the plurality of the first tubes 500*a* are wound around an imaginary second axis (B2-B2') parallel to the first direction. Since each of the first tubes 500*a* includes a first internal space 502, it may be formed in the form of a plurality of pipes.

The conductive wire 620 may be formed in the form of a cylinder to be positioned so as to occupy at least part of the second internal space 602. The conductive wire 620 may be formed in such a structure that it is inserted into the second internal space 602 while being in a state to be brought into contact with at least part of the second tube 600 that is formed in the form of a pipe.

The emitter 420 can emit electrons through a front end 630 of a region in the second tube 600 that does not overlap with the conductive wire 620.

Alternatively, unlike the one shown in FIG. 6, the emitter 420 may consist of only the second tube 600 without including the conductive wire 620. In this case, the second tube 600 may be the emitter 420 itself, and the emitter 420 can emit electrons through the front ends of the plurality of yarns 510 included in the second tube 600. Referring to FIGS. 5 and 6, the emitter 420 can form the front end of a tube structure, in which the front ends of the carbon nanotubes 30 and yarns 510 face the same direction as the imaginary first axis (B1-B1')/second axis (B2-B2') that is parallel to the first internal space 502/the second internal space 602, and as such, the emitter 420 has an advantage in that most of the electrons can be emitted in a direction where each of the carbon nanotubes 30 and the yarns 510 is extended through the front end of a tube structure.

That is, since the emitter 420 is formed in such a structure that it is easy to induce most electrons to be emitted in a certain direction, the emitter 420 has an advantage in that it can concentrate most electrons to a desired collision portion when the emitter 420 is applied to the electromagnetic wave tube 400 that generates an electromagnetic wave through the collision between the target 440 and electrons.

Figure 7:
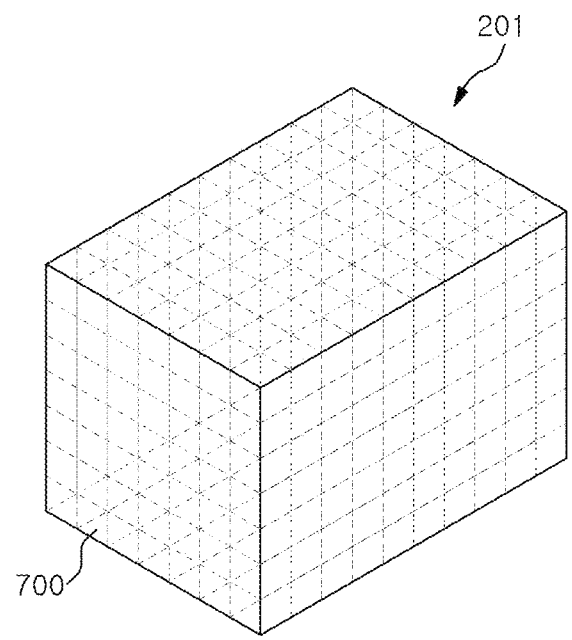
FIG. 7 shows a method for determining the position where an electromagnetic wave tube is to be disposed according to an embodiment of the present disclosure.

FIG. 7 shows a method for determining the position where an electromagnetic wave tube is to be disposed according to an embodiment of the present disclosure.

Referring to FIG. 7, a charge space 201 may be provided inside the charger 200 for charging the air, and such a charge space 201 may be divided into a plurality of lattice spaces 700. In particular, the charge space 201 may refer to the space from the inlet, through which air enters, to the collector 300 in the electrostatic precipitator 100. These lattice spaces may be formed in a three-dimensional structure of hexahedron shape.

The electromagnetic wave tube 400 may be disposed at a position determined based on the ionization efficiency of microparticles. The ionization efficiency may be expressed as the number (or ratio) of lattice spaces in which the intensity of an electromagnetic wave, which reaches each of the plurality of lattice spaces 700, is equal to or greater than a preset threshold value. More specifically, one or more electromagnetic wave tubes 400 may be disposed at one or more positions determined according to Equation 1 below.

$$I_{m,n} = \frac{I_m}{L_{m,n}^2} \qquad \square\text{Equation 1}\square$$

$$A = \sum_{x=1}^{m} \sum_{y=1}^{n} I_{x,y}$$

In the Equation 1 above, m (m is a natural number of 2 or higher) represents the number of the plurality of lattice spaces 700 into which the charge space 201 is divided, n (n is a natural number) represents the number of the electromagnetic wave tube 400 disposed on the top plate 210 and/or the bottom plate 220, $I_m$ represents the amount of generation (intensity) of an electromagnetic wave emitted by the $m^{th}$ electromagnetic wave tube 400, $L_{m,n}$ represents the distance from the electromagnetic wave tube 400, which emits an electromagnetic wave, to the center point of the lattice space 700, which receives an electromagnetic wave, and $I_{m,n}$ represents the amount of an electromagnetic wave generated in the electromagnetic wave tube 400 which reach the lattice space 700 (intensity).

Accordingly, the electromagnetic wave tube 400 may be disposed at a position where the sum (A) of the values obtained by dividing the reached amount ($I_{m-n}$) of the electromagnetic wave ($I_m$) generated in the electromagnetic wave tube 400 by the square of the distance ($L_{m-n}$), from each center point of the center point of the lattice space 700 to the electromagnetic wave tube 400 becomes the maximum (or the position where the sum (A) is higher than the preset threshold value). That is, after measuring the intensity of the electromagnetic wave at each of the plurality of lattice spaces 700, when the position where the intensity of the electromagnetic wave is higher than the preset threshold value is higher than the preset value among the plurality of lattice spaces 700 (e.g., when the intensity of the electromagnetic wave radiated on 80% or higher among the plurality of lattice spaces 700 is higher than the threshold value), it can be interpreted as the ionization efficiency has been reached. The number and/or positions of the electromagnetic wave tube 400 where it is disposed on the top plate 210 and/or the bottom plate 220 may be determined based on the ionization efficiency of microparticles. That is, the electromagnetic wave tube 400 may be disposed by the number determined or positions determined based on the ionization efficiency of microparticles.

Figure 8:
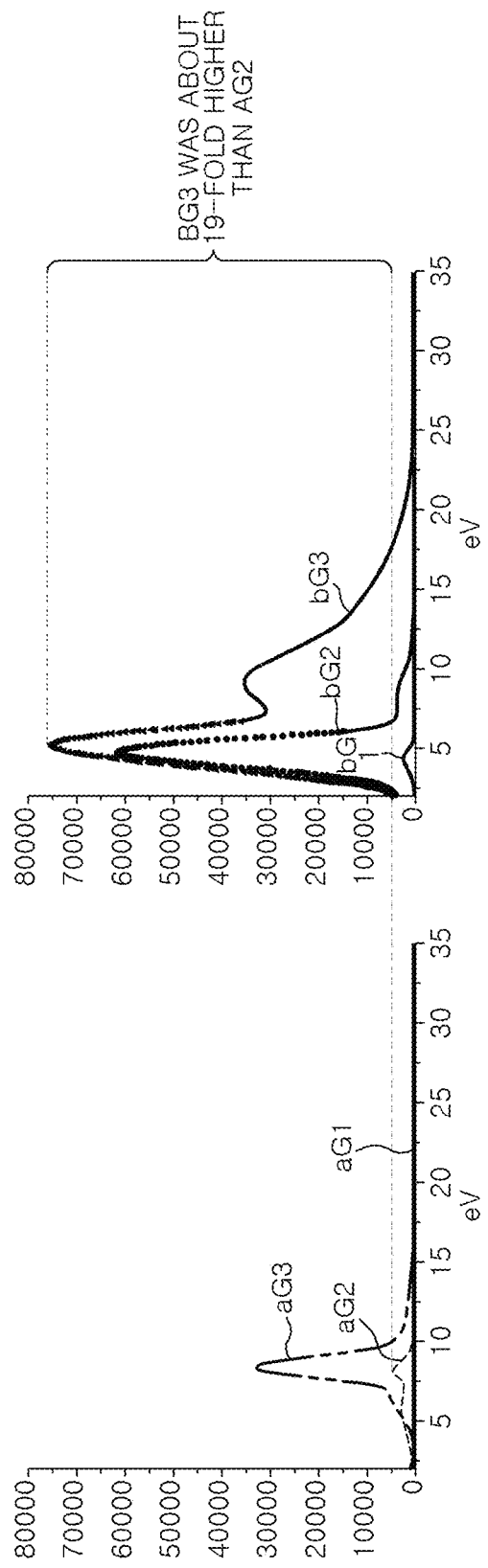
FIG. 8 shows the effect according to the change in a tube voltage using an electromagnetic wave tube, which includes a carbon nanotube-based emitter, according to an embodiment of the present disclosure.

FIG. 8 shows the effect according to the change in a tube voltage using an electromagnetic wave tube, which includes a carbon nanotube-based emitter, according to an embodiment of the present disclosure.

Referring to FIGS. 3 and 8, the emitter 420 can change a tube voltage, which means the maximum voltage provided between the anode and the cathode of an electromagnetic wave tube 400. According to an embodiment, the electromagnetic wave tube including the carbon nanotube-based emitter 420 can change a tube voltage based on a contamination level of contaminated air.

The graph on the left of FIG. 8 shows the performance of an electromagnetic wave tube with a fixed a tube voltage by using a conventional tungsten wire as an emitter, and the graph on the right of FIG. 8 shows the performance of an electromagnetic wave tube which uses a tube voltage that can be changed according to an embodiment of the present disclosure.

More specifically, the first graph (aG1) in the graph on the left of FIG. 8 may show the performance of an electromagnetic wave tube, in which the tube voltage is fixed at 5 kV by using a tungsten wire as an emitter; the second graph (aG2) in the graph on the left of FIG. 8 may show the performance of an electromagnetic wave tube, in which the tube voltage is fixed at 10 kV by using a tungsten wire as an emitter; and the third graph (aG3) in the graph on the left of FIG. 8 may show the performance of an electromagnetic wave tube, in which the tube voltage is fixed at 15 kV by using a tungsten wire as an emitter. Additionally, the first graph (bG1) in the graph on the right of FIG. 8 may show the performance of the electromagnetic wave tube 400, in which the tube voltage is changed to 8 kV according to a contamination level; the second graph (bG2) in the graph on the right of FIG. 8 may show the performance of the electromagnetic wave tube 400, in which the tube voltage is changed to 9 kV according to a contamination level; and the third graph (bG3) in the graph on the right of FIG. 8 may show the performance of the electromagnetic wave tube 400, in which the tube voltage is changed to 10 kV according to a contamination level When the second graph (aG2) in the graph on the left of FIG. 8 was compared with the third graph (bG3) in the graph on the right of FIG. 8, it was found that the performance of the electromagnetic wave tube, in which with respect to the emitter 420, the conventional tungsten wire-based thermoionic cathode emitter was changed to a carbon nanotube-based emitter and thus the tube voltage was changed according to a contamination level, the performance (bG3) was about 19-fold higher than the performance (aG2), where the tube voltage was fixed at 10 kV.

Accordingly, according to an embodiment of the present disclosure, when the tube voltage is changed based on a contamination level, it is possible to optimize power consumption and air quality improvement efficiency depending on the environment.

The above description is merely illustrative of the technical idea of the present disclosure, and various modifications and variations can be made by those skilled in the art to which the present disclosure pertains without departing from the essential quality of the present disclosure. Therefore, the embodiments disclosed herein are not intended to limit the technical spirit of the present disclosure, but to illustrate it, and the scope of the technical spirit of the present disclosure is not limited by these embodiments. The protection scope of the present disclosure should be interpreted by the following claims, and all technical ideas within the scope equivalent thereto should be interpreted as being included in the scope of the present disclosure.

What is claimed is:

1. An electrostatic precipitator with an electromagnetic wave tube comprising a carbon nanotube (CNT)-based emitter, the electrostatic precipitator comprising:
   a charger comprising the CNT-based emitter and configured to ionize microparticles, in contaminated air introduced from the environment, by emitting an electromagnetic wave; and
   a collector configured to collect the ionized microparticles to discharge clean air,
   wherein the charger is further configured to adjust a tube voltage of the electromagnetic wave based on a contamination level of the contaminated air, and
   wherein in response to the contamination level being higher than a preset standard, the charger is configured to change the tube voltage of the electromagnetic wave from a first voltage to a second voltage higher than the first voltage, and in response to the contamination level being lower than the preset standard, the charger is configured to change the tube voltage of the electromagnetic wave from the first voltage to a third voltage lower than the first voltage.

2. The electrostatic precipitator of claim 1, wherein the charger further includes a top plate and a bottom plate that form a passage through which air flows; and
   wherein the electromagnetic wave tube is detachably attached to at least one of the top plate and the bottom plate.

3. The electrostatic precipitator of claim 1, wherein a position where the electromagnetic wave tube is attached is configured to be determined based on an ionization efficiency of the microparticles.

4. The electrostatic precipitator of claim 1, wherein the CNT-based emitter includes a plurality of yarns formed in a structure extending in a predetermined direction by agglomeration of a plurality of carbon nanotubes.

5. The electrostatic precipitator of claim 1, wherein the electromagnetic wave has a wavelength of 50 nm or less.

6. A method for removing microparticles in contaminated air using the electrostatic precipitator of claim 1, the method comprising:
   introducing contaminated air from the environment;
   ionizing, by the charger, microparticles contained in the contaminated air by emitting an electromagnetic wave; and
   collecting, by the collector, the ionized microparticles and discharging clean air.

7. The method of claim 6, wherein the charger further includes a top plate and a bottom plate that form a passage through which air flows and wherein the electromagnetic wave tube is detachably attached to at least one of the top plate and the bottom plate.

8. The method of claim 6, wherein a position where the electromagnetic wave tube is attached is determined based on an ionization efficiency of the microparticles.

9. The method of claim 6, wherein the CNT-based emitter includes a plurality of yarns formed in a structure extending in a predetermined direction by agglomeration of a plurality of carbon nanotubes.

10. The method of claim 6, wherein the electromagnetic wave has a wavelength of 50 nm or less.

* * * * *